United States Patent
Takamiya

(10) Patent No.: US 11,522,853 B2
(45) Date of Patent: Dec. 6, 2022

(54) IMAGE FORMING APPARATUS HAVING TRANSMISSION FUNCTION, AND CONTROL METHOD AND STORAGE MEDIUM THEREFOR

(71) Applicant: CANON KABUSHIKI KAISHA, Tokyo (JP)

(72) Inventor: Hiroyoshi Takamiya, Fujisawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/821,256

(22) Filed: Mar. 17, 2020

(65) Prior Publication Data

US 2020/0220871 A1    Jul. 9, 2020

Related U.S. Application Data

(63) Continuation of application No. 16/297,840, filed on Mar. 11, 2019, now Pat. No. 10,637,859, which is a continuation of application No. 14/311,603, filed on Jun. 23, 2014, now Pat. No. 10,263,983.

(30) Foreign Application Priority Data

Jun. 24, 2013   (JP) .................................. 2013-131612

(51) Int. Cl.
*H04L 9/40*   (2022.01)
(52) U.S. Cl.
CPC ................................ *H04L 63/0876* (2013.01)
(58) Field of Classification Search
CPC ..................... H04L 63/0876; H04N 1/00127
See application file for complete search history.

(56) References Cited

U.S. PATENT DOCUMENTS

| | | | |
|---|---|---|---|
| 5,019,961 A | 5/1991 | Addesso et al. |
| 6,226,677 B1 | 5/2001 | Slemmer |
| 6,330,080 B1 | 12/2001 | Omori |
| 6,339,685 B1 | 1/2002 | Okamoto et al. |

(Continued)

FOREIGN PATENT DOCUMENTS

| | | |
|---|---|---|
| CN | 1744648 A | 3/2006 |
| CN | 102238170 A | 11/2011 |

(Continued)

OTHER PUBLICATIONS

Office Action issued in Korean Appln. No. 10-2014-0070580 dated Mar. 23, 2016.
Notice of Allowance issued in Korean Appln. No. 10-2014-0070580 dated Nov. 24, 2016. English translation provided.
Office Action issued in Chinese Appln. No. 201410288964.0 dated Nov. 28, 2016. English translation provided.

(Continued)

*Primary Examiner* — Simon P Kanaan
(74) *Attorney, Agent, or Firm* — Rossi, Kimms & McDowell LLP

(57) ABSTRACT

An image forming apparatus capable of maintaining user's convenience in performing transmission while utilizing a transmission setting even when destinations usable for the transmission according to the transmission setting are restricted to a predetermined destination such as an authenticated user's address in order to enhance security. In a case where destinations usable for the transmission according to the transmission setting are restricted to an authenticated user's address and where at least one transmission destination registered in the transmission setting differs from the user's address, the at least one transmission destination registered in the transmission setting is rewritten to the authenticated user's address.

11 Claims, 6 Drawing Sheets

(56) References Cited

U.S. PATENT DOCUMENTS

| | | | |
|---|---|---|---|
| 6,377,990 | B1 | 4/2002 | Slemmer et al. |
| 7,050,184 | B1 | 5/2006 | Miyamoto |
| 8,572,707 | B2 | 10/2013 | Tuchman et al. |
| 9,357,032 | B2 | 5/2016 | Ikeda |
| 2005/0039011 | A1 | 2/2005 | Kagawa |
| 2006/0050303 | A1 | 3/2006 | Oomori et al. |
| 2007/0143626 | A1 | 6/2007 | Okuda |
| 2007/0143827 | A1 | 6/2007 | Nicodemus et al. |
| 2010/0033760 | A1 | 2/2010 | Kimura |
| 2012/0236348 | A1 | 9/2012 | Ochi |

FOREIGN PATENT DOCUMENTS

| | | | |
|---|---|---|---|
| JP | 2002027210 | A | 1/2002 |
| JP | 2005045759 | A | 2/2005 |
| JP | 2006101484 | A | 4/2006 |
| JP | 2009171309 | A | 7/2009 |
| JP | 2010220256 | A | 9/2010 |
| JP | 2011028319 | A | 2/2011 |
| JP | 2012198692 | A | 10/2012 |

OTHER PUBLICATIONS

Office Action issued in Japanese Appln. No. 2013131612 dated Feb. 21, 2017.
Office Action issued in Chinese Appln. No. 201410288964.0 dated Jul. 14, 2017. English translation provided.
Office Action issued in U.S. Appl. No. 14/311,603 dated Nov. 20, 2015.
Office Action issued in U.S. Appl. No. 14/311,603 dated Jul. 15, 2016.
Office Action issued in U.S. Appl. No. 14/311,603 dated Dec. 30, 2016.
Office Action issued in U.S. Appl. No. 14/311,603 dated Aug. 11, 2017.
Office Action issued in U.S. Appl. No. 14/311,603 dated Jan. 11, 2018.
Notice of Allowance issued in U.S. Appl. No. 14/311,603 dated Aug. 10, 2018.
Notice of Allowance issued in U.S. Appl. No. 14/311,603 dated Dec. 12, 2018.
Office Action issued in U.S. Appl. No. 16/297,840 dated Jul. 29, 2019.
Notice of Allowance issued in U.S. Appl. No. 16/297,840 dated Dec. 18, 2019.

IMAGE FORMING APPARATUS HAVING TRANSMISSION FUNCTION, AND CONTROL METHOD AND STORAGE MEDIUM THEREFOR

BACKGROUND OF THE INVENTION

Field of the Invention

The present invention relates to an image forming apparatus having a function to perform transmission to a destination registered in a transmission setting, a control method therefor, and a storage medium storing a program for causing a computer to execute the control method.

Description of the Related Art

In recent years, image forming apparatuses have been demanded to be reduced in cost and size and to have high functionality. Some image forming apparatus is configured to cooperate with an external device (e.g. a personal computer) to provide a highly convenient function. For example, there is known a multi-function peripheral that has a function to perform transmission via a network to a destination selected from among destinations registered in a transmission setting.

When transmission is performed to a destination registered in a transmission setting, there is a fear of security problems. To enhance security and to simplify a destination input operation, an image transmission apparatus has been proposed that has a user authentication function and that automatically sets a transmission destination according to authentication when a user is successfully authenticated (see, for example, Japanese Laid-open Patent Publication No. 2010-220256). Also, there has been proposed a method in which transmission destinations usable for transmission according to transmission setting are restricted to an authenticated user's address.

However, if transmission to destinations other than e.g. the authenticated user's address is restricted, there is a fear that user's convenience in utilizing the transmission setting is lowered.

SUMMARY OF THE INVENTION

The present invention provides an image forming apparatus capable of maintaining user's convenience in performing transmission while utilizing a transmission setting even when destinations usable for the transmission according to the transmission setting are restricted to a predetermined destination such as an authenticated user's address in order to enhance security, and provides a control method for the image forming apparatus and a storage medium storing a program for causing a computer to execute the control method.

According to one aspect of this invention, there is provided an image forming apparatus having a transmission function to perform transmission according to a transmission setting in which at least one transmission destination is registered, comprising an obtaining unit configured to obtain a predetermined destination, and a control unit configured, in a case where destinations usable for the transmission according to the transmission setting are restricted to the predetermined destination and where the at least one transmission destination registered in the transmission setting differs from the predetermined destination, to rewrite the at least one transmission destination registered in the transmission setting to the predetermined destination.

With this invention, user's convenience to utilize the transmission setting can be maintained even when security is enhanced by restricting destinations usable for transmission according to the transmission setting to the predetermined destination such as an authenticated user's address.

Further features of the present invention will become apparent from the following description of exemplary embodiments (with reference to the attached drawings).

DESCRIPTION OF THE EMBODIMENTS

The present invention will now be described in detail below with reference to the drawings showing preferred embodiments thereof.

First Embodiment

Figure 1:
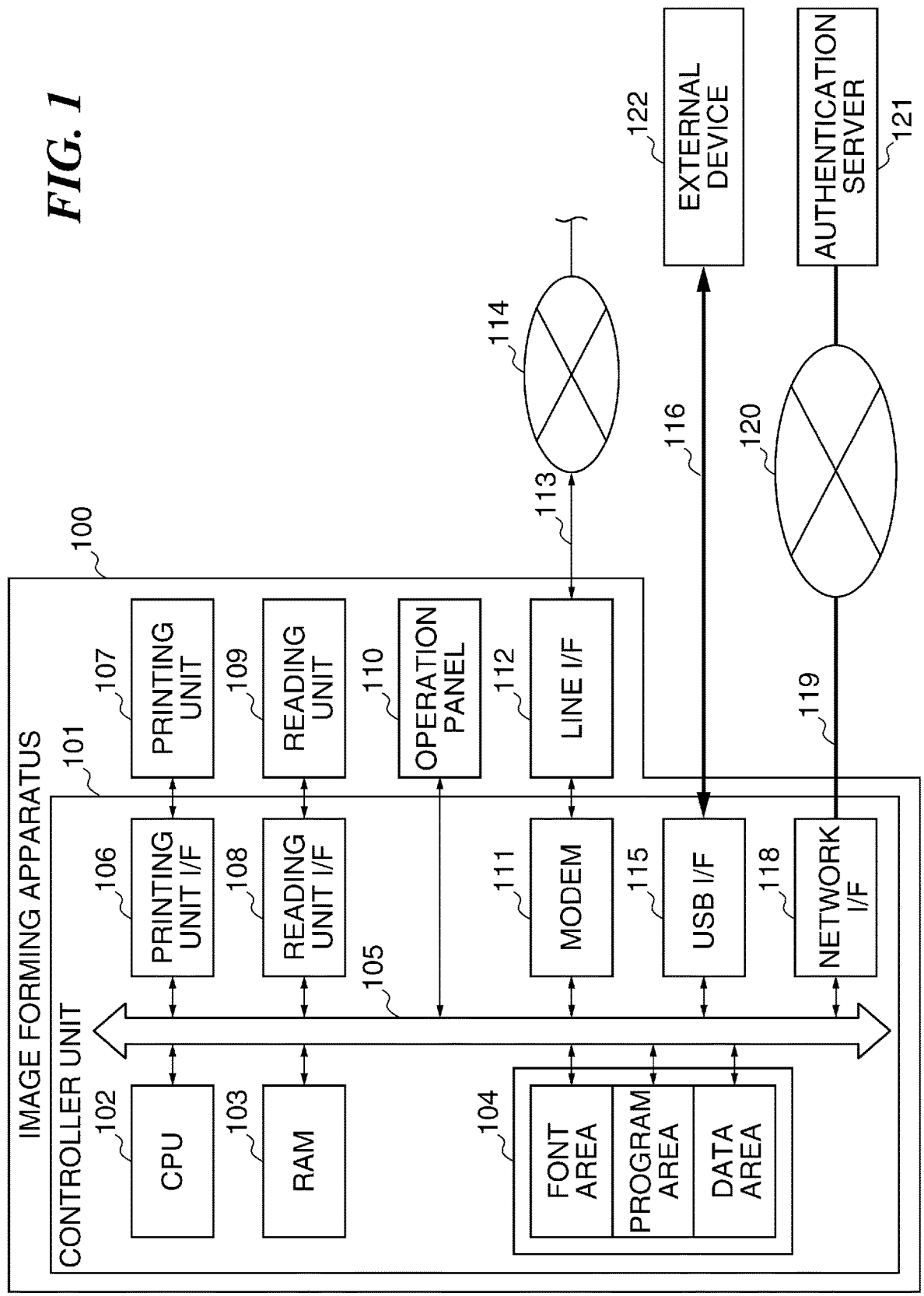
FIG. 1 is a block diagram showing a hardware construction of an image forming apparatus according to a first embodiment of this invention.

FIG. 1 shows in block diagram a hardware construction of an image forming apparatus according to a first embodiment of this invention. It should be noted that illustrated blocks represent hardware modules of the apparatus, and arrows between the blocks represent the flows of data and instructions.

The image forming apparatus 100 is a multi-function peripheral that has a printing function, an image reading function, a transmission function, a user authentication function, etc.

The image forming apparatus 100 includes a controller unit 101, and includes a printing unit 107, a reading unit 109, an operation panel 110, and a line I/F 112, which are controlled by the controller unit 101.

The controller unit 101 includes a CPU 102, a RAM 103, a ROM 104, a printing unit I/F 106, a reading unit I/F 108, a modem 111, a USB I/F 115, and a network I/F 118, which are connected to a system bus 105.

The CPU 102 reads control programs stored in a program area of the ROM 104 onto the RAM 103 and executes the same to thereby totally control respective parts of the image forming apparatus 100. It should be noted that the control programs can be stored in e.g. a hard disk drive (HDD), not shown.

The printing unit I/F 106 is an interface (I/F) with a printing unit 107 (printer engine), and the reading unit I/F 108 is an interface with a reading unit 109 (scanner engine). The CPU 102 processes a read image signal input from the reading unit 109 via the reading unit I/F 108, and outputs a resultant recording image signal to the printing unit 107 via the printing unit I/F 106. Although the printing unit 107 and the reading unit 109 are incorporated in the image forming apparatus 100 in the illustrated example, these units can be externally connected to the image forming apparatus 100.

The CPU 102 causes a display device of the operation panel 110 to display characters, symbols, etc. by using font information stored in a font area of the ROM 104, and receives instruction information supplied from the operation panel 110 according to a user's instruction. The ROM 104 has a data area stored with apparatus information of the image forming apparatus 100, user's telephone book information, department management information, etc., which are read and/or updated by the CPU 102, where necessary.

The modem 111 is connected to a public line network 114 via the line I/F 112 and via a telephone line 113, and capable of communicating with another image forming apparatus, a facsimile apparatus, a telephone set, etc., which are not shown.

The USB I/F 115 is connected via a USB cable 116 to an external device 122 such as a PC, and controls communication between the controller unit 101 and the external device 122.

The network I/F 118 is connected with an authentication server 121 via a communication cable such as a LAN cable 119 and via a network 120 such as a LAN, and controls communication between the controller unit 101 and the authentication server 121.

The authentication server 121 retains pieces of user information such as pieces of destination information respectively representing user's addresses. The CPU 102 obtains destination information associated with an authenticated user from the authentication server 121. It should be noted that the pieces of user's address information can be retained in the mage forming apparatus instead of being retained in the authentication server.

Figure 2:
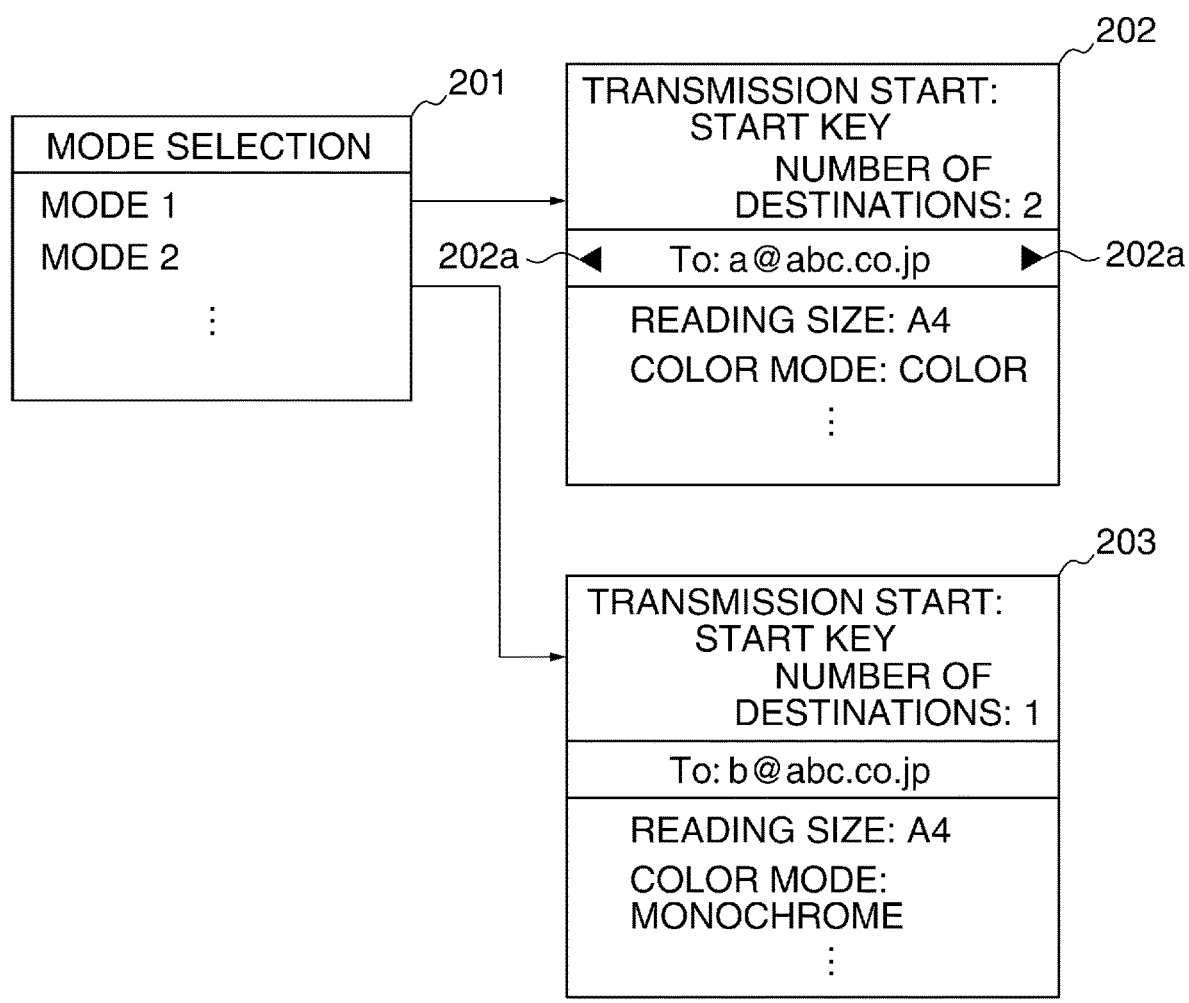
FIG. 2 is a view showing an example of a mode selection screen displayed on an operation panel of the image forming apparatus and showing an example of a transmission setting screen displayed on the operation panel in response to mode selection on the mode selection screen in a case where transmission to an authenticated user's address and to other addresses is permitted.
Figure 3:
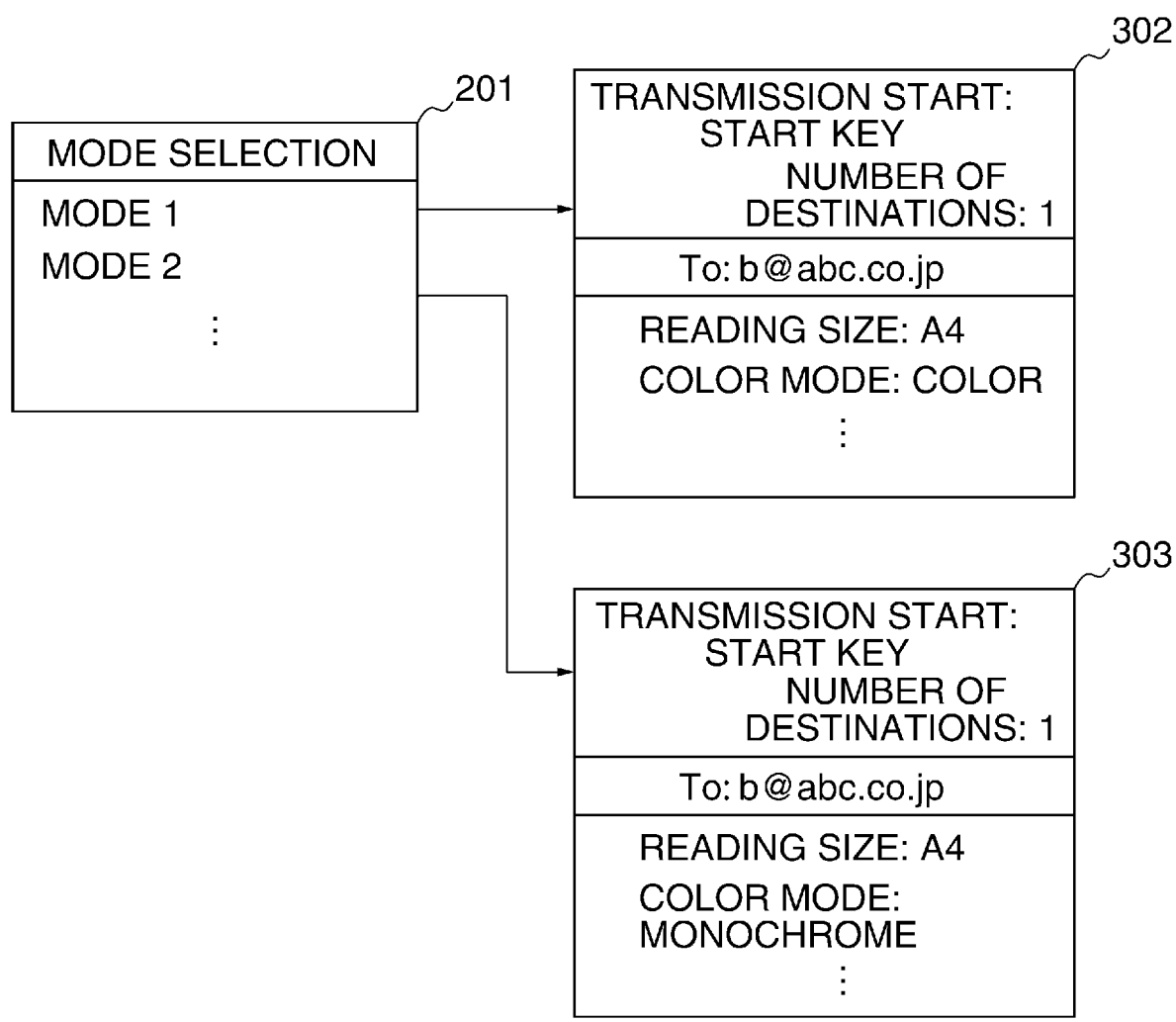
FIG. 3 is a view showing an example of a transmission setting screen displayed on the operation panel in response to mode selection on the mode selection screen in a state that transmission only to an authenticated user's address is permitted.
Figure 4:
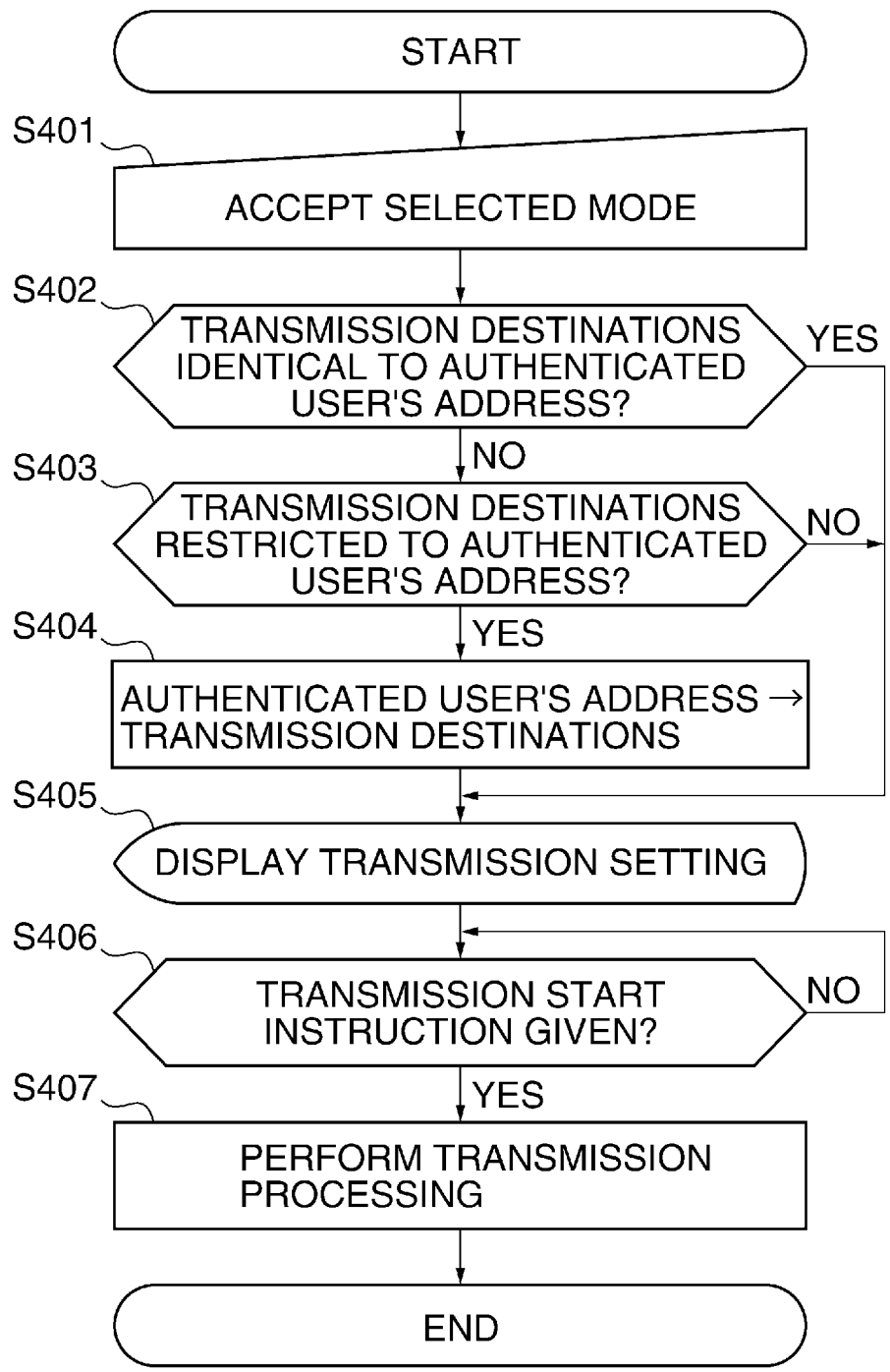
FIG. 4 is a flowchart showing the flow of a transmission destination designating process performed by the image forming apparatus of the first embodiment.

With reference to FIGS. 2 to 4, a description will be given of a transmission destination designating process that is performed by the image forming apparatus 100 at the time of transmission. In the following, an example case where scanned data is transmitted by mail will be described.

FIG. 2 shows an example of a mode selection screen displayed on the operation panel 110 of the image forming apparatus 100, and shows an example of a transmission setting screen displayed on the operation panel 110 in response to mode selection on the mode selection screen in a case where transmission to an authenticated user's address and to other addresses is permitted.

In FIG. 2, reference numeral 201 denotes the mode selection screen for selecting any one of modes of the image forming apparatus 100. Transmission settings for respective ones of the modes are registered in the image forming apparatus 100. In the case of mail transmission of scanned data, each transmission setting includes one or more transmission destinations (such as addresses) and includes an image processing setting about image reading size, color mode, etc.

When any one of the modes is selected on the mode selection screen 201 in a state that transmission to an authenticated user's address and to other addresses is permitted, a shift is made to the transmission setting screen for displaying the transmission setting corresponding to the selected mode. For example, when a "mode 1" is selected on the mode selection screen 201, display is switched from the mode selection screen 201 to a transmission setting screen 202. When a "mode 2" is selected, display is switched to a transmission setting screen 203.

On the transmission setting screen 202, indications "number of destinations: 2" and "To: a@abc.co.jp" are displayed. This indicates that a transmission destination "a@abc.co.jp" and an unillustrated transmission destination are registered in the transmission setting that corresponds to the mode 1. To display the unillustrated transmission destination, a scroll button 202a is pressed.

On the transmission setting screen 202, indications such as "reading size: A4" and "color mode: color" are displayed. In other words, contents of these indications are registered as the image processing setting for the mode 1. It should be noted that the content of the image processing setting is not limited to the illustrated one.

On the transmission setting screen 203, indications "number of destinations: 1" and "To: b@abc.co.jp" are displayed. This indicates that only the transmission destination "b@abc.co.jp" is registered in the transmission setting that corresponds to the mode 2. In the image processing setting for the mode 2, "reading size: A4," "color mode: monochrome" and the like are registered.

As described above, the user can select a desired mode on the mode selection screen 201, whereby the transmission setting (transmission destination and image processing setting) corresponding to the selected mode can be read and utilized from among the transmission settings registered in the image forming apparatus 100.

FIG. 3 shows an example of a transmission setting screen that is displayed on the operation panel 110 in response to the mode selection on the mode selection screen in a state that transmission only to an authenticated user's address is permitted.

In this example, it is assumed that a user having a transmission destination "b@abc.co.jp" is authenticated in advance by the user authentication function of the image forming apparatus 100. It is also assumed that in the ROM 104 or the like there is stored destination restriction information representing whether or not destinations usable for transmission according to transmission setting be restricted to a predetermined destination, e.g., a safe destination such as user's address. In this example, it is assumed that there is stored destination restriction information representing that transmission destinations be restricted to user's address.

As previously described, two transmission destinations including the destination "a@abc.co.jp" are registered in the transmission setting corresponding to the mode 1. When the transmission to the authenticated user's address and to other addresses is permitted, the two transmission destinations registered in the transmission setting are displayed as shown in FIG. 2 on the transmission setting screen 202.

In this example, the user whose address is b@abc.co.jp is authenticated in advance, and destinations usable for the transmission according to transmission setting are restricted to the authenticated user's address "b@abc.co.jp." In other words, transmission only to the authenticated user's address is permitted. When the mode 1 is selected on the mode selection screen 201 of FIG. 3, the two transmission destinations registered in the transmission setting are rewritten to the authenticated user's address "b@abc.co.jp," and display is switched from the mode selection screen 201 to the transmission setting screen 302. On the screen 302, the transmission destination "b@abc.co.jp" after the switching is displayed. On the other hand, the image processing setting for the mode 1 is not rewritten. In other words, setting contents such as "reading size: A4" and "color mode: color" are displayed.

When the mode 2 is selected on the mode selection screen 201 of FIG. 3, display is switched from the mode selection screen 201 to the transmission setting screen 303. On the transmission setting screen 303, the transmission destination "b@abc.co.jp" is displayed, without being rewritten, since only the authenticated user's address "b@abc.co.jp" is registered, as transmission destination, in the transmission setting for the mode 2.

As described above, the authenticated user can enhance the security in performing transmission by selecting, as transmission destination, a safe destination (e.g., user's address) on the transmission setting screen 302 or 303.

FIG. 4 shows in flowchart the flow of a transmission destination designating process performed by the image forming apparatus 100. This process is performed by the CPU 102 by executing a relevant control program read from the ROM 104.

In step S401, the CPU 102 causes the operation panel 110 to display the mode selection screen 201, and accepts a mode selected on the screen 201.

In step S402, the CPU 102 reads all of one or more transmission destinations contained in the transmission setting that corresponds to the selected mode, and obtains an authenticated user's address from the authentication server 121 or obtains a user's address obtained from the server 121 and then stored into e.g. the RAM 103 at the time of user authentication. Next, the CPU 102 determines whether or not all of the one or more transmission destinations contained in the transmission setting are each identical to the authenticated user's address.

If all of the one or more transmission destinations are each identical to the authenticated user's address (YES to step S402), the CPU 102 proceeds to step S405. On the other hand, if any one of the one or more transmission destinations differs from the authenticated user's address (NO to step S402), the CPU 102 proceeds to step S403.

In step S403, the CPU 102 determines whether or not destinations usable for transmission according to transmission setting are restricted to the authenticated user's address, while referring to the destination restriction information.

If transmission to an address other than the authenticated user's address is permitted (NO to step S403), the CPU 102 proceeds to step S405. On the other hand, if destinations usable for transmission according to transmission setting are restricted to the authenticated user's address (YES to step S403), the CPU 102 proceeds to step S404 where the CPU 102 rewrites each of the one or more transmission destinations registered in the transmission setting to the authenticated user's address.

In step S405, the CPU 102 causes the operation panel 110 to display the transmission setting (one or more transmission destinations and image processing setting) that corresponds to the selected mode. In step S406, the CPU 102 waits for a transmission start instruction given by the user via the operation panel 110. When the transmission start instruction is given, transmission processing is performed in step S407.

As described above, according to the first embodiment, in a case where destinations usable for transmission according to transmission setting are restricted to an authenticated user's address and where any one of one or more transmission destinations registered in the transmission setting differs from the authenticated user's address, all of the one or more transmission destinations registered in the transmission setting are each rewritten to the authenticated user's address. As a result, even when security is enhanced by restricting transmission destinations to a safe destination (e.g., authenticated user's address), the user's convenience in utilizing the transmission setting can be maintained.

Second Embodiment

An image forming apparatus according to a second embodiment is the same as that of the first embodiment except that the user is prompted to confirm and select whether or not transmission destinations in a transmission setting are to be rewritten to a user's address. A description of points common to both the embodiments will be omitted.

Figure 5:
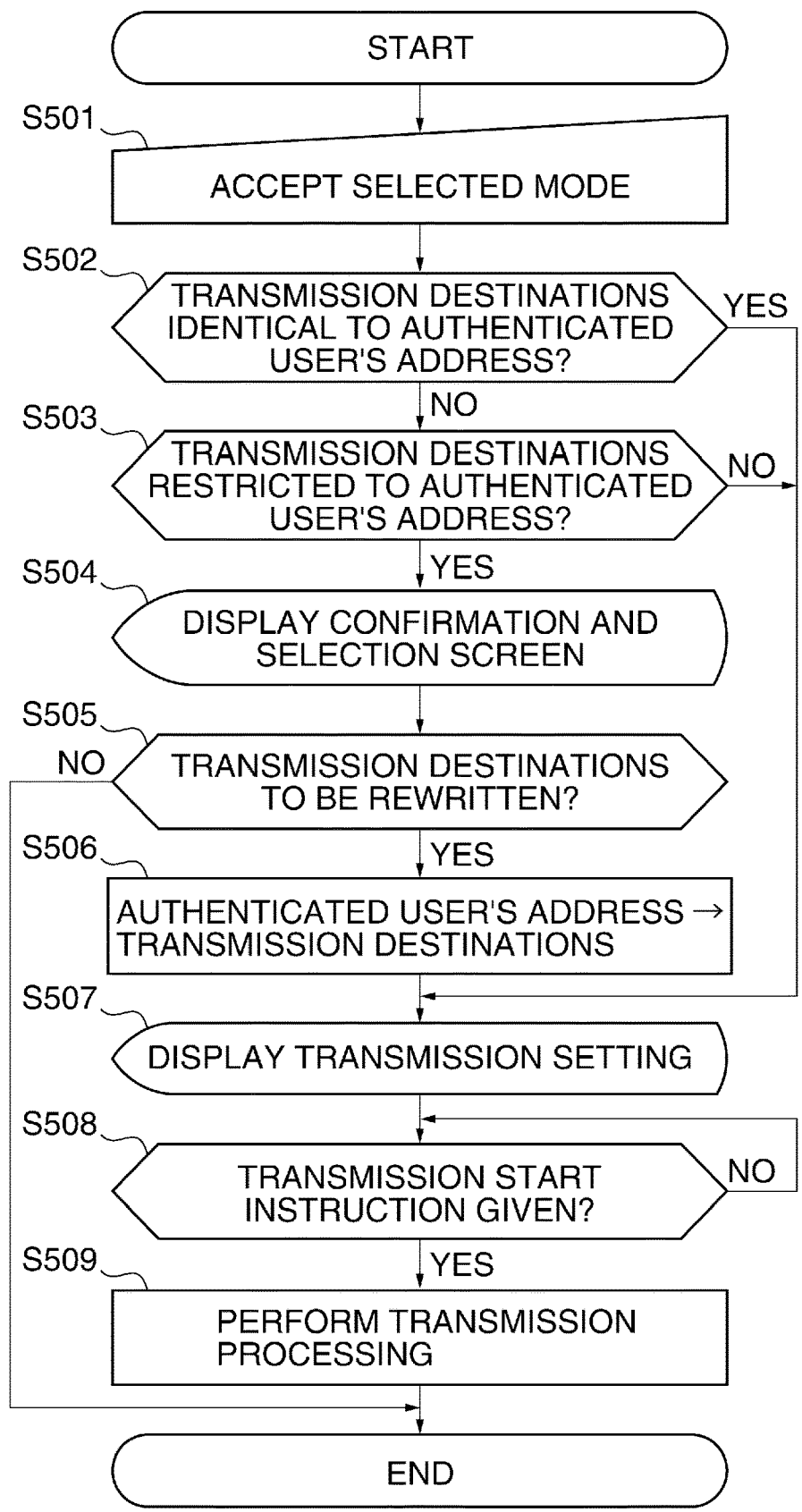
FIG. 5 is a flowchart showing the flow of a transmission destination designating process performed by an image forming apparatus according to a second embodiment of this invention.

FIG. 5 shows in flowchart the flow of a transmission destination designating process performed by the image forming apparatus of this embodiment. This process is performed by the CPU 102 by executing a relevant control program read from the ROM 104.

In steps S501-S503 of FIG. 5, the CPU 102 performs the same processing as that performed in steps S401-S403 of FIG. 4. More specifically, the CPU 102 determines whether or not one or more transmission destinations contained in a transmission setting corresponding to a mode selected on the mode selection screen 201 are each identical to the address of the authenticated user. If the answer to this determination is YES, the flow proceeds to step S504.

Figure 6:
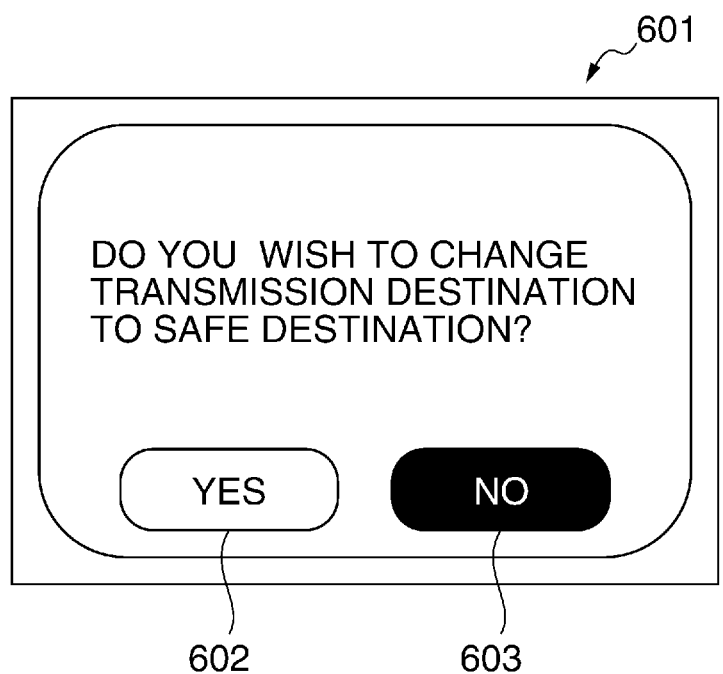
FIG. 6 is a view showing an example of a screen displayed on the operation panel in step S504 of FIG. 5.

In step S504, the CPU 102 causes the operation panel 110 to display a confirmation and selection screen 601 shown in FIG. 6 for prompting the user to confirm and select whether one or more transmission destinations in the transmission setting are each to be rewrite to a safe destination e.g. the user's address. On the confirmation and selection screen 601, a "YES" button 602 and a "NO" button 603 are displayed.

In step S505, based on a user's instruction, the CPU 102 determines whether or not one or more transmission destinations in the transmission setting are to be rewritten. More specifically, when the "NO" button 603 on the confirmation and selection screen 601 is pressed, it is determined that the one or more transmission destinations are not to be rewritten, and the present process is completed. On the other hand, if the 'YES" button 602 on the screen 601 is pressed, it is determined that the one or more transmission destinations are to be rewritten, and the process proceeds to step S506.

In steps S506-S509, the CPU 102 executes the same processing as that performed in steps S404-S407 of FIG. 4. More specifically, after the one or more transmission destinations in the transmission setting are each rewritten to the authenticated user's address in step S506, or if the answer to step S502 is YES, or if the answer to step S503 is NO, the transmission setting is displayed on the operation panel 110 and transmission processing is performed in response to a transmission start instruction.

As described above, according to the second embodiment, inadvertent transmission to an undesired destination can be prevented by permitting the user to select whether or not the one or more transmission destinations in the transmission setting are to be rewritten to e.g. the user's address.

In the first and second embodiments, when any one of one or more transmission destinations in a transmission setting registered in the image forming apparatus 100 differs from an authenticated user's address, each of the one or more transmission destinations is rewritten to the user's address. However, whether rewriting of each transmission destination to the authenticated user's address is to be permitted or prohibited can be set. Even in that case, transmission to a destination other than a safe destination such as the authenticated user's address can be prohibited.

In the first and second embodiments, in a case where destinations usable for transmission according to transmission setting are restricted to a safe destination (e.g. an authenticated user's address) and where any one of the one or more transmission destinations registered in the transmission setting differs from e.g. the authenticated user's address, each of the one or more transmission destinations is rewritten to the authenticated user's address. However, in a case where at least one destination identical to the authenticated user's address is contained in transmission destinations registered in a transmission setting, only the at least one destination identical to the authenticated user's address can be left in the transmission setting, while deleting at least one other transmission destination from the transmission setting.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-131612, filed Jun. 24, 2013, which is hereby incorporated by reference herein in its entirety.

What is claimed is:

1. An image processing apparatus comprising:
a network interface;
a storage that stores at least a plurality of sets each of which is a set of a plurality of destinations and a setting for transmitting image data to each destination of the plurality of destinations;
a user interface that selects a set of a plurality of destinations and a setting for transmitting image data to the plurality of destinations from the plurality of sets stored in the storage; and
a controller that causes the image processing apparatus to:
set whether to inhibit transmission of the image data to another destination other than one predetermined destination;
set, if a set of destinations and a setting is selected by the user interface and the image processing apparatus is not set to inhibit the transmission of the image data to the another destination, the destinations as a transmission destination of the image data, and transmit the image data to each destination of the set destinations in accordance with the set setting; and
set, if the set of the destinations and the setting is selected by the user interface and the image processing apparatus is set to inhibit the transmission of the image data to the another destination, only the one predetermined destination as the transmission destination of the image data, and transmit the image data once to the set one predetermined destination in accordance with the set setting,
wherein the one predetermined destination is a destination received by the network interface from a server.

2. The image processing apparatus according to claim 1, wherein, if the set of the destinations and the setting is selected by the user interface and the image processing apparatus is set to inhibit the transmission of the image data to the another destination, the controller causes the image processing apparatus to change, when the image processing apparatus reads and sets the destinations and the setting, the destinations to only the one predetermined destination.

3. The image processing apparatus according to claim 1, further comprising a display that displays a selection screen for selecting whether to set only the one predetermined destination,
wherein the controller causes the image processing apparatus to set only the one predetermined destination in a case where setting only the one predetermined destination is selected.

4. The image processing apparatus according to claim 1, wherein the user interface receives a transmission instruction, and
wherein the controller causes the image processing apparatus to transmit the image data to only the one predetermined destination in accordance with the set setting when the transmission instruction is received by the user interface.

5. The image processing apparatus according to claim 1, wherein the controller causes the image processing apparatus to inhibit, based on destination restriction information stored in the image processing apparatus, transmission of the image data to the another destination other than the one predetermined destination.

6. The image processing apparatus according to claim 1, wherein the one predetermined destination is an e-mail address.

7. The image processing apparatus according to claim 1, further comprising a scanner,
wherein the image data is obtained by the scanner.

8. A control method of an image processing apparatus, the control method comprising:
storing at least a plurality of sets each of which is a set of a plurality of destinations and a setting for transmitting image data to each destination of the plurality of destinations;
selecting a set of a plurality of destinations and a setting for transmitting image data to the plurality of destinations from the plurality of sets stored in the storage;

setting whether to inhibit transmission of the image data to another destination other than one predetermined destination received from a server;

setting, if a set of destinations and a setting is selected and the transmission of the image data to the another destination is not set to be inhibited, the destinations as a transmission destination of the image data, and transmitting the image data to each destination of the set destinations in accordance with the set setting; and setting, if the set of the destinations and the setting is selected and the transmission of the image data to the another destination is set to be inhibited, only the one predetermined destination as the transmission destination of the image data, and transmitting the image data once to the set one predetermined destination in accordance with the set setting.

9. A non-transitory computer-readable storage medium storing a program for causing a computer to execute a control method of an image processing apparatus, the control method comprising:

storing at least a plurality of sets each of which is a set of a plurality of destinations and a setting for transmitting image data to each destination of the plurality of destinations;

selecting a set of a plurality of destinations and a setting for transmitting image data to the plurality of destinations from the plurality of sets stored in the storage;

setting whether to inhibit transmission of the image data to another destination other than one predetermined destination received from a server;

setting, if a set of destinations and a setting is selected and the transmission of the image data to the another destination is not set to be inhibited, the destinations as a transmission destination of the image data, and transmitting the image data to each destination of the set destinations in accordance with the set setting; and setting, if the set of the destinations and the setting is selected and the transmission of the image data to the another destination is set to be inhibited, only the one predetermined destination as the transmission destination of the image data, and transmitting the image data once to the set one predetermined destination in accordance with the set setting.

10. The image processing apparatus according to claim 1, wherein the controller causes the image processing apparatus to set the one predetermined destination without setting the another destination if the set of the destinations and the setting is selected by the user interface and the image processing apparatus is set to inhibit the transmission of the image data to the another destination, and transmit the image data to the set predetermined destination in accordance with the set setting.

11. The image processing apparatus according to claim 1, wherein, if the set of the destinations and the setting is selected by the user interface and it is set to inhibit the transmission of the image data to the another destination, the one predetermined destination is set without setting the another destination.

* * * * *